(12) United States Patent
Szviatovszki et al.

(10) Patent No.: US 6,470,010 B1
(45) Date of Patent: Oct. 22, 2002

(54) METHOD AND SYSTEM FOR SETTING UP A SPEECH CONNECTION IN DIFFERENT NETWORKS

(75) Inventors: Balazs Szviatovszki, Budapest (HU); Matti Kaakkola, Masala (FI); Harri Koponen, Kauniainen (FI); Björn Melen, Espoo (FI); Ossi Väänänen, Naantali (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/945,696
(22) PCT Filed: May 24, 1996
(86) PCT No.: PCT/SE96/00680
  § 371 (c)(1),
  (2), (4) Date: Nov. 21, 1997
(87) PCT Pub. No.: WO96/38018
  PCT Pub. Date: Nov. 28, 1996

(30) Foreign Application Priority Data

May 24, 1995 (FI) .................................................. 952557
Apr. 17, 1996 (FI) .................................................. 961690

(51) Int. Cl.[7] .............................................. H04L 12/66
(52) U.S. Cl. ...................... 370/356; 370/401; 370/524; 379/900; 709/249
(58) Field of Search ................................. 370/352, 353, 370/356, 380, 389, 392, 396, 401, 404, 427, 435, 450, 465, 485, 522, 524; 379/90.01, 93.01, 93.05, 93.09, 100.15, 100.16, 88.17, 900, 230, 218.01; 709/203, 223, 217–222, 249

(56) References Cited

U.S. PATENT DOCUMENTS

| | | | | |
|---|---|---|---|---|
| 5,604,737 A | * | 2/1997 | Iwami et al. | 370/352 |
| 5,675,638 A | * | 10/1997 | Orgasawara et al. | 379/220 |
| 5,696,809 A | * | 12/1997 | Voit | 379/5 |
| 5,708,834 A | * | 1/1998 | Sasaki et al. | 709/203 |
| 5,991,394 A | * | 11/1999 | Dezonno et al. | 379/265 |
| 6,014,379 A | * | 1/2000 | White et al. | 370/389 |
| 6,021,126 A | * | 2/2000 | White et al. | 370/352 |
| 6,078,583 A | * | 6/2000 | Takahara et al. | 370/356 |
| 6,185,283 B1 | * | 2/2001 | Fuller et al. | 379/210 |
| 6,215,790 B1 | * | 4/2001 | Voit et al. | 370/354 |
| 6,249,576 B1 | * | 6/2001 | Sassin et al. | 370/352 |
| 6,292,479 B1 | * | 9/2001 | Bartholomew et al. | 370/352 |
| 6,351,464 B1 | * | 2/2002 | Galvin et al. | 370/356 |

FOREIGN PATENT DOCUMENTS

| | | |
|---|---|---|
| DE | 42 25 389 C1 | 9/1993 |
| EP | 0 629 092 A2 | 12/1994 |
| WO | 94/28660 | 12/1994 |

* cited by examiner

Primary Examiner—Seema S. Rao
(74) Attorney, Agent, or Firm—Burns, Doane, Swecker & Mathis, L.L.P.

(57) ABSTRACT

The objective of the invention is a system, comprising an ISDN-network, having access through the intelligent network service switching point (SSP) to the services offered by the intelligent network service control point (SCP), a data network, in which at least one computer has a data network-address, and a gateway connecting the networks. The call can be connected to a telephone integrated to the computer, so that the data network-address used by the subscriber's computer and the subscriber's personal identifier are at first transferred to the gateway, which codes the data network-address. Thereafter the coded address, the gateway address and the subscriber's personal identifier are transmitted to the intelligent network and recorded in the database of the Service Data Point (SDP). The intelligent network has now the required data to create the speech connection between the mentioned subscriber and another subscriber.

13 Claims, 5 Drawing Sheets

METHOD AND SYSTEM FOR SETTING UP A SPEECH CONNECTION IN DIFFERENT NETWORKS

The invention relates in general to the setting up of a speech connection and especially in a system comprising an intelligent network and a data network with connected computers.

The rapid growth of the telecommunication has enabled the teleoperators to offer their users many different kinds of services. A network architecture offering advanced services is called the intelligent network IN. The intelligent network architecture can be applied in most telecommunication networks as e.g. in switched telephone networks PSTN (Public Switched Telephone Network), in mobile and packet switched networks PSPDN (Packet Switched Public Data Network) as well as in ISDN- and B-ISDN-networks (Integrated Services Digital Network, Broadband-ISDN).

Irrespective of the network technology, the objective of the intelligent network architecture is to facilitate the creation, control and management of new telecommunication services.

The Service Switching Point (SSP) contains call management and service selection functions. It can observe the intelligent network service requests. The Service Control Point (SCP) contains the service programs used to produce the intelligent network services. The Service Data Point (SDP) is a database, which contains the client and network data used by the SCP service programs to produce individual services. The Intelligent Peripheral (IP) offers special functions, such as messages and voice and multi-dialling identification. The tasks of the Service Management Point (SMP) include database management, network control and testing, as well as network data collection. It can connect to all other physical entities.

The Basic Call State Model (BCSM) defined in connection with the IN-network illustrates the different stages of call control and contains the points where the call control can be interrupted in order to start the intelligent network service. It identifies the detection points in the call and connection process, where the IN service logic entities can be in interaction with the basic call and connection management characteristics.

As mentioned above, the intelligent network architecture can also be applied in the ISDN-net. The Integrated Digital Services Network (ISDN) is characterized in that the user can with the same user interface utilize several communication services either separately or simultaneously. Different applications, such as e.g. terminal, terminal group, multi-service exchange, local area network, other private network, etc. are connected to the ISDN by a restricted user interface group. The ISDN- network provides for the development of the present telephone to be part of a multi-service terminal, such as the combination "telephone+PC", enabling simultaneous transmission of speech and data.

The ISDN user-network interface provides different types of channels for the information transmission between the subscriber and the network. The B-channel, which operates at a speed of 64 kbit/s and is provided with timing, is used for all information transmission, e.g. for transmission of all kinds of coded speech or data. The D-channel, which transmission speed is either 16 kbit/s or 64 kbit/s, is primarily intended as a signalling channel for circuit switched connections. Combining the channels provide different channel constructions and ISDN-user interfaces. The Basic Access has a 2B+D-structure and the Basic System Access has a 30B+D-structure. The Basic Access is used to connect one or several terminals directly to the ISDN-network, whereas the Basic System Access is used for connecting big switches and local area networks to the ISDN-network.

The interconnection of local networks through ISDN is today possible, although at a speed of 64 kbit/s, but the speed is however not sufficient for the transmission of large files or graphic applications. The deficiencies of the ISDN-networks are eliminated by networks using the Asynchronous Transfer Mode (ATM) as multiplexing method. ATM is a connection-based technology, in which the blocks belonging to the same connection are identified based on e.g. the virtual channel (VCI) or the virtual path (VPI) of the heading identifier. The value of the VCI used is defined during setup and the VPIs are setup more permanently using the network management functions. The virtual channel identifier relates either to the connection or to a single service component, e.g. a picture, voice, etc. The identifier is connection dependent and is maintained during the whole connection. Signalling and user data are transmitted on separate virtual channels. Several extensive computer networks are based on the ATM-technology.

Known intelligent network services are the call remote control, the follow-me-diversion (FMD), in which the service subscriber receives a number to which the coming calls are transferred according to the phone number each time registered for the subscriber, and the personal number UPT (universal personal telecommunications), in which the service subscriber can make calls from any terminal and receive calls to any terminal in different networks. In the latter service, the call type is only restricted by the properties of the terminal and the network, the subscriber has a personal and network independent number.

The problem with the types of services described above is that the call cannot be transferred to a phone connected to a network formed by computers, a data network, which is outside the digital network, e.g. the ISDN-network. In this network the transmission connections can e.g. be based on ATM. The worldwide Internet e.g. is such a network. In the data network every terminal, such as the PC- or work station, has its own data network address for receiving incoming information. In Internet the standard address is in the form user@outn.,,out1.0.top. User is the name of the user, the ou can be from zero to a few and top is top level domain, in Finland e.g. fi. If a telephone is integrated to such a terminal, a mechanism has not yet been introduced for setting up a call between this telephone and e.g. a subscriber connected to the ISDN-net. The lack of this mechanism prevents from using the intelligent network services such as the personal number UPT.

The objective of this invention is thus to provide a mechanism by which the subscriber primarily can call any number from a telephone connected to the data network such as internet via the work station, and secondly by which the subscriber can direct the incoming calls to the work station currently in use. In the latter case the calling subscriber does not necessarily know the location of the called subscriber.

The invention is a method of setting up a speech connection between the users of two or several terminals being in different networks in a system comprising an intelligent network, in which the call from the exchange and/or switch is transferred through the Service Switching Point (SSP), which starts the inquiry via the common channel signalling network to the service data base, in which the required information is traced for the handling of the call, and which returns this data through the signalling network or corresponding and SSP back to the exchange and/or switch, the exchange and/or switch uses the data to set up the call, a data network, in which at least one logged-in computer has a data network address and a telephone integrated to the computer, and a gateway connecting the networks, in which method the address information of the logged-in computer in the data network is transferred to the gateway, from the gateway the message is transmitted to the intelligent network to update the address data of the subscriber's computer logged into the data network, and the speech connection between the mentioned subscriber and the other subscriber is created controlled by the intelligent network, when speech connection is desired.

The invention utilizes the intelligent network and the personal addresses of the data network work stations so that, when the subscriber starts his work station and connects into the data network, he at the same time sends his current data network address as well as his personal identifier PI, which are transmitted to the gateway connecting the data network and the ISDN-net. Internet is used as an example in the description.

The gateway converts the internet-address to an ISDN-address and sends it and the PI-identifier via the intelligent network Service Switching Point (SSP) to the Service Control Point (SCP). SCP stores the data in the Service Data Point (SDP) database.

All control functions are concentrated in the intelligent network, wherefore a speech connection can be set up between the subscriber and any other subscriber using the intelligent network functions. The other subscriber can be an ISDN-subscriber, a PSTN-subscriber or a subscriber connected to the data network. Because the intelligent network has the routing information about the subscriber's location, the subscriber can use services like the call remote control FMD (follow-me-diversion) and the personal number UPT (universal personal telecommunications).

The invention is below presented more in detail by means of one preferable form of embodiment and with reference to the enclosed pictures, of which

FIG. 4 presents a block diagram of the activation of the call control to the IN.

Figure 1:
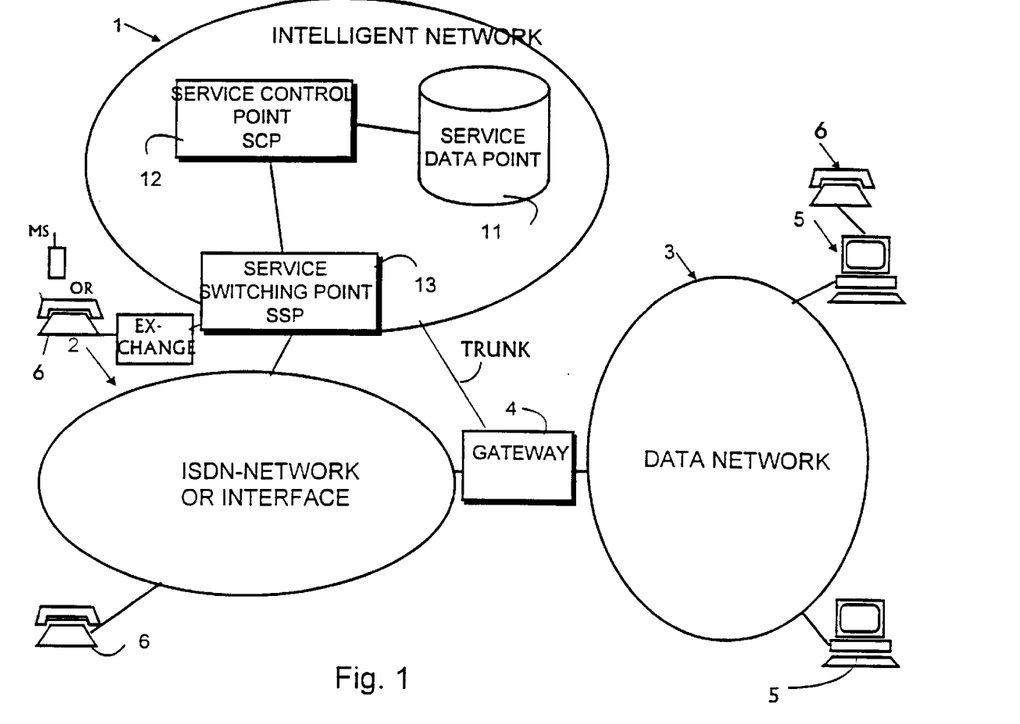
FIG. 1 presents the system architecture in a simplified form.

FIG. 1 presents with reference number 1 the essential functional entireties of the IN-network for the subject invention. The general tasks of the service switching point 13 and the service data point 11 have been presented already in the beginning of the description. The intelligent network 1 is switched to the ISDN-network 2 through the service switching point 13. The reference number 6 presents the subscriber apparatus, in this case a telephone, which is switched with the Basic Access 2B+D-construction directly to the ISDN-network. The interconnection of the ISDN-network 1 and the intelligent network 2 is well known in the field.

Reference number 3 illustrates the network formed by computers, which here is an internet having PC- or work stations 5. The network 3 is also as such known. The PC comprises a central processing unit (CPU), memories (program and main memory, such as ROM or RAM, hard disk), cards to produce additional activities and a bus for connecting the parts. The PC input and output can be displayed on the screen or e.g. with a printer. The user can enter data using the keyboard, a mouse or other corresponding standard feed device. PC contains today multimedia equipment for picture, voice or text processing. The PC is provided with e.g. a sound card or corresponding to which a microphone and loudspeaker can be connected for the transmission and receiving of speech. The microphone and the loudspeaker can be built into the PC or the PC-peripheral device, the display unit, be external or a common handset. For the data network, the PC is provided with a network adapter through which the PC is in connection with the data network.

Figure 2:
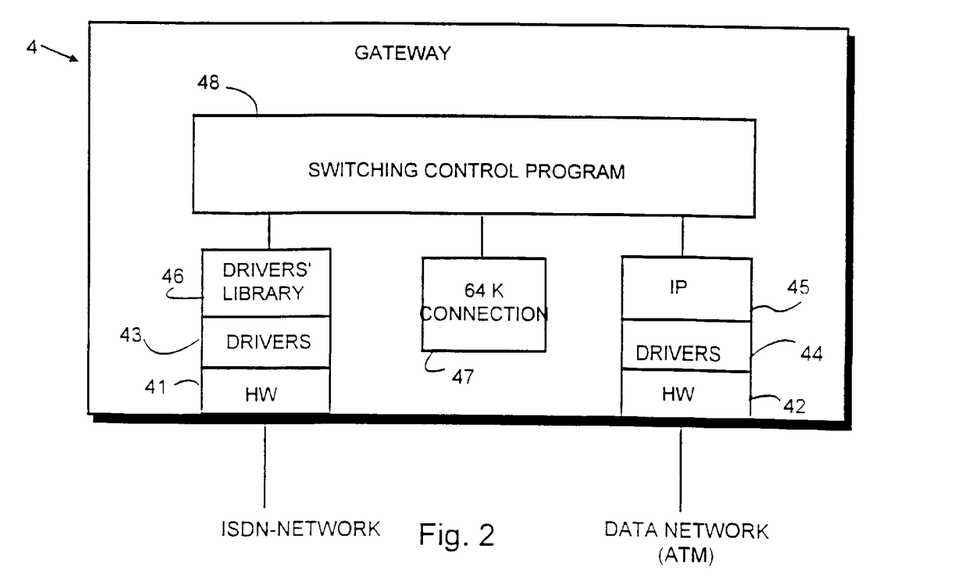
FIG. 2 shows a simplified construction of the gateway.

For the interconnection of the networks 2 and 3 is below suggested the ISDN-gateway 4, the simplified block diagram of which is presented in FIG. 2. The gateway 4, which can be a server, comprises towards the ATM-network a user interface, which includes the hardware 42, their drivers 44 and the internet protocol processing block 45. On the other side it comprises towards the ISDN-network a user interface, which can be a standard basic system access 30B+D, including the hardware 41, their drivers 43 and the drivers' development kit library 46.

The additions according to the invention to the gateway function are as follows: the gateway 4 talks with computers connected to the computer or data network and has at least the following tasks a) call identification, i.e. it identifies the call request from the ISDN- and data networks, b) transmission of the A- and B-numbers, and c) creation and release of the speech connection inside the gateway and from the gateway to the work station telephone. The gateway switching control program 48 receives from the ATM-network the internet-address and converts it into a decimal coded ISDN-address. It transmits the converted address to the intelligent network to be recorded in the user database SDP. In the method according to the invention, the routing information to the subscriber has to be transmitted to the intelligent network database. This happens so that the user when starting the work station logs normally into internet, possibly using a password. Thereafter he/she registers into the intelligent network by starting a special telephone program. The program sends to the gateway an internet-address according to the internet protocol (IP) and the user's personal identification number given to the work station by the user in response to the telephone program request. The service number of the intelligent network service handling the call control can be added automatically to the transmission by the program or should be added by the user. The service can be of the known personal number-type UPT (universal personal telecommunications). The information set sent by the program to the gateway is thus "the intelligent network service number+the IP-address+the user's personal identifier". The mechanism for forming and transmitting this information set in practice is not essential for the invention, it is only essential that the gateway receives the information set. When the gateway has received from the data network the information set sent by the work station, its switching control program 48, FIG. 2, encodes the IP-protocol address to the decimal form used in the ISDN-world. The internet-address form is called the dotted decimal representation of the binary 32 bit information structure, whereby the address can be expressed in the form 8bit. 8bit. 8bit. 8bit. The binary address is decimal coded into 10 digit decimals (10 base figures) in known way. The gateway 4 transmits the series "the intelligent network service number+the decimal coded IP-address+the user's personal identifier+the gateway address" to the ISDN-network exchange, using e.g. Telefonaktiebolaget L M Ericsson's AXE-exchange and the ISDN connected thereto.

The gateway can use for the transmission of this series a proper message according to the ISUP-protocol (Integrated Services Digital Network user Part (CCITT Number 7) (International Telegraph and Telephone Consultative Committee), such as the IAM-message (Initial Address Message) and place the data in a suitable IAM-message field defined in ETSI (European Telecommunications Standards Institute). A proper field could be the known A- or B-number sub-field or directly the A-number field. In both cases the intelligent network is capable of reading the information transmitted. When the message has reached the exchange, the intelligent network service switching point SSP 13, FIG. 1, identifies the intelligent network service number and starts the intelligent network service. The service places the decimal-coded IP-address defining the subscriber's location+the user's personal identifier+the gateway address in the service data database. When the calling subscriber, e.g. the ISDN-subscriber 6, dials the intelligent network service number and the personal identification number of the subscriber logged into the intelligent network through the work station, the intelligent network is capable of retrieving from the database the information of the called subscriber and accordingly connect the call to the telephone integrated to the computer. All calls to and from the work station are centralized controlled by the intelligent network. The call routing is thus using standard IN-databases and traditional ISDN-network node routing tables. The call is routed to a gateway obtained from the subscriber data, which gateway performs the IP-number conversion and thereafter routes the call to the correct work station.

According to one preferable embodiment, the intelligent network service is like a personal number UPT-service, which here is called the advanced personal telecommunication service. The advanced personal telecommunication service enables to reach the person from several numbers. The service subscriber has a so called personal number comprising the intelligent network service number+the personal subscriber identifier. The number could e.g. be 02-08-445566. Number 02 defines the operator and number 08 the operator service, which in our example is an advanced personal telecommunication service. 0208 is thus from the subscriber's viewpoint a service number. Number 445566 is the personal user identifier. The subscriber's mobile phone number, paging device number, voice-mail number and according to the subject invention the work station telephone number have been recorded in the intelligent net. The calling subscriber dials only the number 02-08-445566, which transfers the call to the intelligent network, whose intelligent network service checks from the database which actual numbers correspond to the personal user identifier. The service calls the subscriber at the different numbers in a given order and connects the call to where the subscriber answers. The calling subscriber does not know the real location of the called subscriber. The order for searching the called subscriber is optional, but the work station telephone number should obviously be given the highest priority. If the user has not registered through the work station, he can possibly be reached at the next number, thus avoiding unnecessary signalling and call delay.

Figure 3:
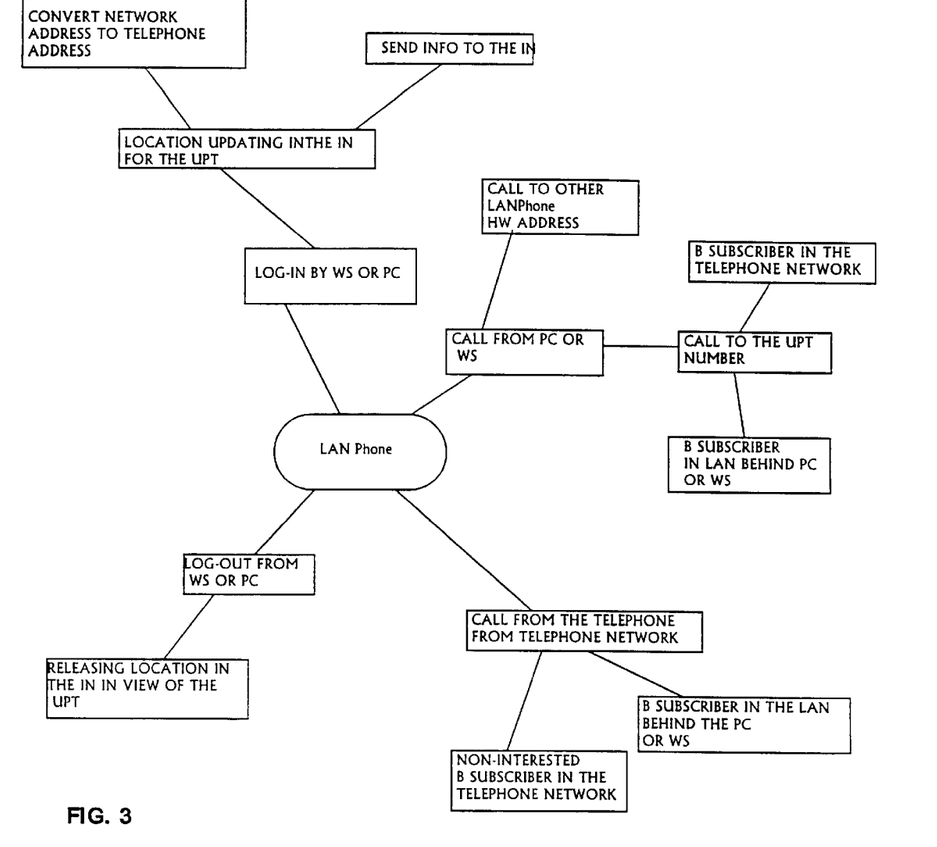
FIG. 3 shows a basic diagram of how calls can be placed in the network after the logging-in of the work station the telephone user.
Figure 4:
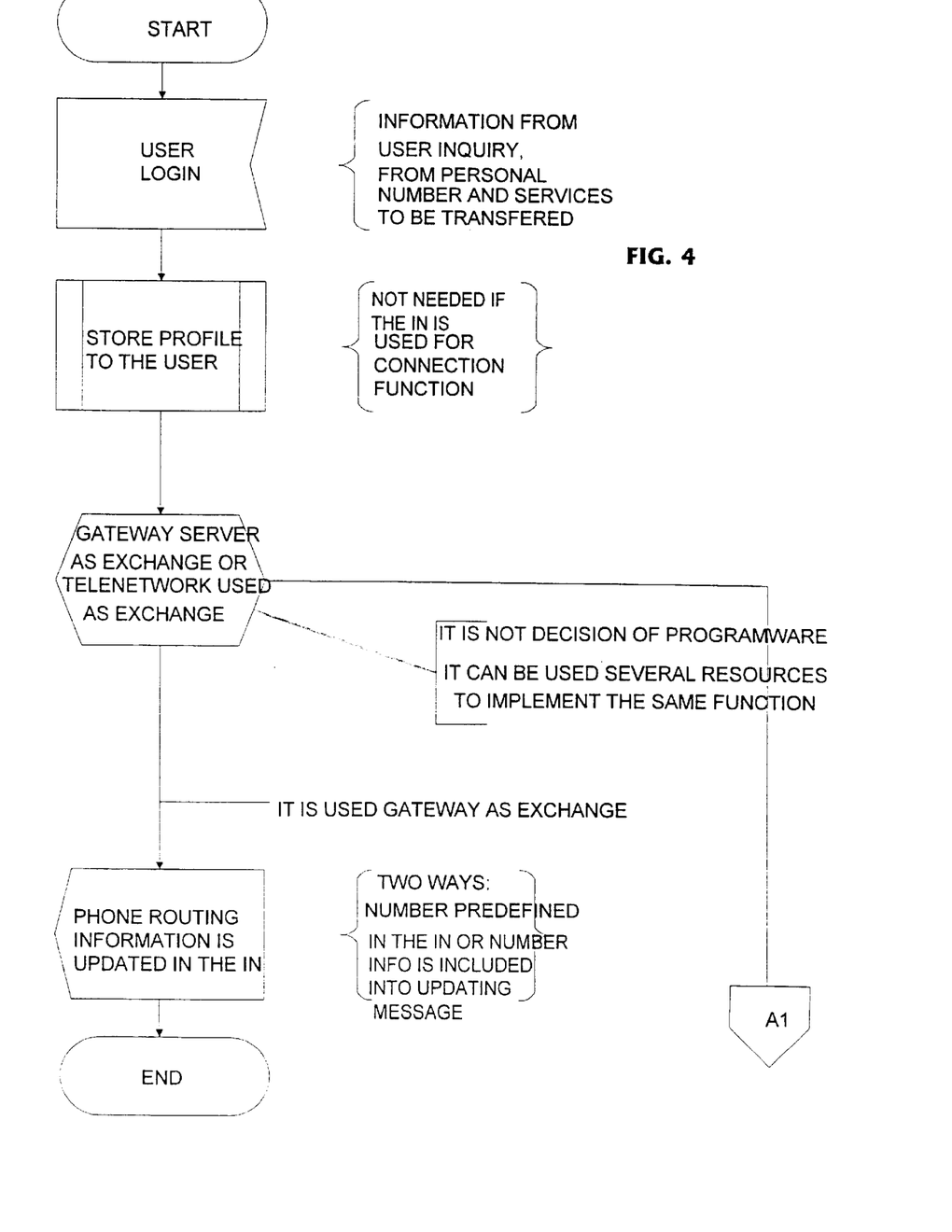
Figure 5:
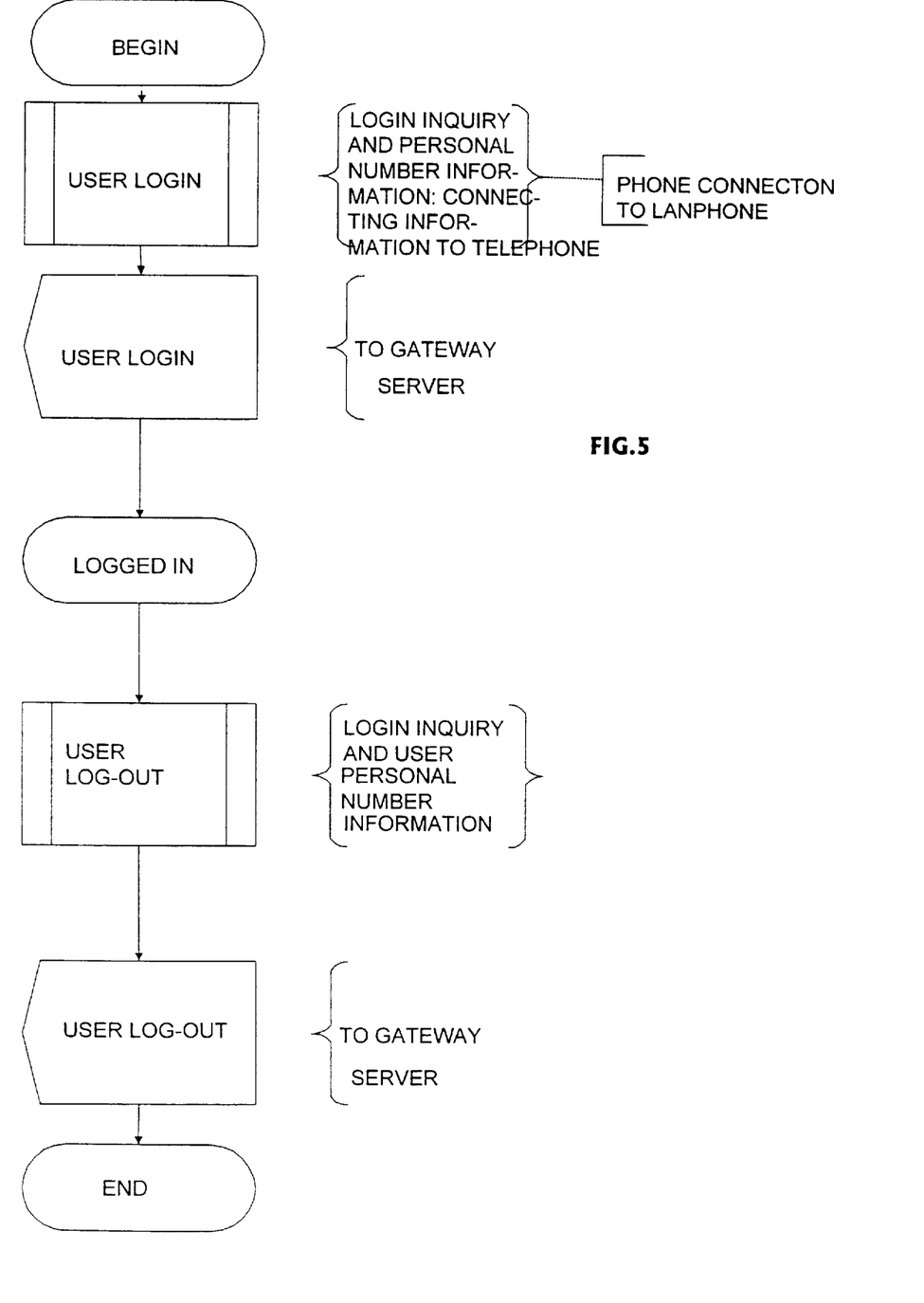
FIG. 5 shows a block diagram of the work station log-in data stages to the gateway.
Figure 6:
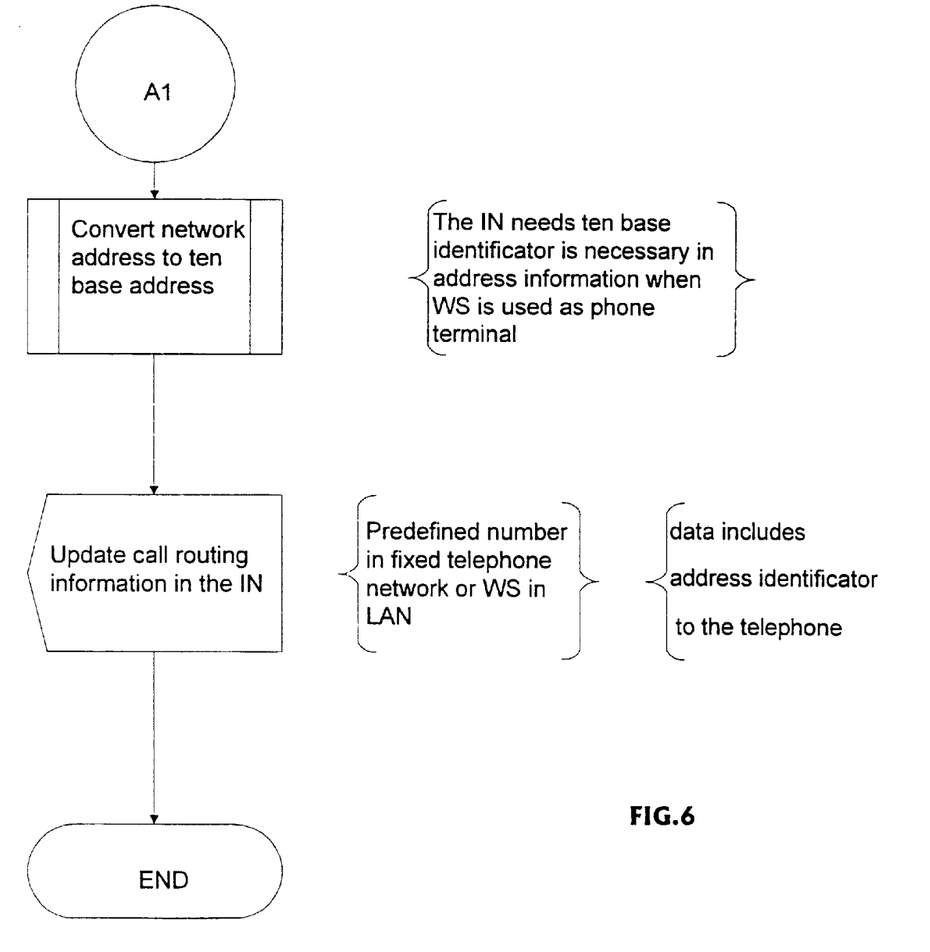
FIG. 6 shows a block diagram of another possible activation of FIG. 4.

As all subscriber data are recorded in the same location in the service datapoint 11, FIG. 1, the subscriber management is easy. It is also possible for the service subscriber himself to define the priority order of the numbers where he can be reached. FIGS. 3, 4, 5 and 6 illustrate transactions wherein the call ends at the work station and starts from the work station. FIG. 3 illustrates, more specifically, how calls can be placed in the network after the telephone user logs-in at the work station. FIG. 4 illustrates activation of call control to the IN-network. FIG. 5 illustrates the process of logging-in at the work station through the gateway. FIG. 6 illustrates an alternative process of activating call control to the IN-network.

When the call terminates at the work station, the call process comprises two stages: the intelligent network has first to be reached and after that the called subscriber controlled by the intelligent network. In this case the billing of the call can be such that the B-subscriber, i.e. the service subscriber, pays most part of the costs, and the calling A-subscriber pays a certain basic charge. Another option is to charge the A-subscriber more than the basic charge in which case a voice-message is sent to him informing about the call costs. The actual billing is made afterwards based on the billing records. The calling A-subscriber, who could be a plain old telephone (POT)-network subscriber or an ISDN-subscriber, dials on his phone the intelligent network service number+the personal user identifier. The number can still be the above mentioned 02-08-445566. The exchange identifies from the service number 0208 that it is an intelligent call and transmits the call to the service switching point 13, which starts the exchange of messages with the service control point 12 and transmits the user identifier 445566 to the service logic, which controls the call from this point onwards. The service logic checks from the database 11 which numbers correspond to the user identifier and in which order the B-subscriber is searched. It discovers that the B-subscriber has registered to the work station phone. The first stage is concluded, i.e. the intelligent network has been accessed and the service knows the coded IP-address of the B-subscriber and the ISDN-gateway number.

The second stage comprises the transmitting of the call to the work station phone. This occurs so that the call is first transmitted to the gateway 4 and the B-subscriber IP-number is disclosed. Thereafter the gateway decodes the IP-number into an internet-address and establishes the voice-connection to the correct work station 5. Finally, the gateway switches connection between the ISDN-network and the data network. There are at least two different ways of transmitting the call to the gateway 4.

In the first way the gateway number and the IP-address are in the ISUP-protocol initial address message (IAM) placed in the field reserved for the C-number. The C-number means as is known the number obtained in the number conversion by the intelligent network service from the database. The A-number is thus the number of the calling subscriber, the B-number is the number dialled by the calling subscriber, which contains the personal identifier of the B-subscriber and the C-number is the actual number retrieved from the database to which the call is to be routed. In this case the C-number is "the gateway number+the IP-address coded into tens digits". This first method is operator dependent.

The second way utilizes the fact that ISDN enables the use of an extra field in the address messages such as the IAM, which field identifies different entities behind the ISDN-address. The gateway number is thus placed in the field reserved for the C-number of the initial address message and the IP-address is placed in the sub-address field related thereto. IN-solutions of some manufactures such as the applicant have considered the information transmission to an extra field and the reading of this field.

In both ways the gateway number routes the call to the right gateway. The gateway number can be of the PBX-(Private Branch Exchange)-number type or a combination of a special routing prefix and a gateway information. The such encoded IP-number comes transparently through the ISDN-network to the right gateway 4, which reads it from the C-number field or from the extra field. Thereafter the gateway is capable of routing the call based on the internet-address to the right work station or PC 5.

Next it is considered the case when the call is placed from a phone connected to a computer 5 (FIG. 1). Billing is then the problem, as from the intelligent network's viewpoint the starting point of the call is the gateway and the actual subscriber cannot easily be identified behind the gateway. An identifying procedure must therefore be introduced in order to bill the right person for the call. This can be implemented e.g. as follows:

The subscriber dials at first the intelligent network service number and his personal user identifier, based on which the service identifies the subscriber. This stage can be free of charge. The number sequence can be e.g. 0800-02-09-445566, in which the service number part 0800 discloses the reversed billing, 02 is the operator identifier and 09 the service identifier. 445566 is the personal user identifier. After this the billing is no more a problem. Finally the subscriber dials the number of the called subscriber, which can be a PSTN(Public Switched Telephone Network)-number, an ISDN-number or a personal number, if the called subscriber has it. The IN-network transmits the call to the right destination, and if the number is a personal number, checks from its database the actual number to which the call is to be routed. The actual number can thus also be an internet-address.

The method according to the invention, in which all control functions are centralized in the intelligent network, enables to reach the subscriber by phone even when he is occupied with his computer. When he moves to another computer, he can before leaving delete his registering from the intelligent network database by dialling the intelligent network service number and his personal user identifier and by setting proper options (mobile phone, pager, etc.) The old registration is alternatively deleted automatically when the user registers from a new computer.

To prevent the intelligent network from setting up a speech connection through a damaged gateway, it can occasionally check the condition of the gateway and assign a condition flag. The condition of the flag is checked when the call is set up and if the flag indicates a gateway disorder, the call is not unnecessary tried to set up but the call is placed to the pager, mobile phone or another number given by the database.

It should further be noted that the control functions of the gateway and of the speech transfer and switching control functions of the phone connected to the computer have been implemented both in the gateway and in the computer. The description and the figures related thereto are only intended to illustrate the subject invention. Different adaptions and modifications are obvious to experts within the field without deviating from the scope and basic idea of the invention as presented in the enclosed claims.

What is claimed is:

1. A method of setting up a speech connection between a first user and a second user in a communication system including an intelligent network and a data network interconnected by a gateway, the second user being located in the data network, the method comprising the steps of:

transmitting a message including a data network address of a terminal with which the second user is associated, from the terminal via the gateway to the intelligent network, in order to notify the intelligent network of a location of the second user, said step of transmitting a message comprising:

converting the data network address of the terminal into a coded address in the gateway;

transmitting the coded address, a gateway address and a personal identifier of the second user to the intelligent network; and storing the coded address, the gateway address and the personal identifier in a service database; and based on the stored address information, setting up a speech connection between the second user at the terminal and the first user, the speech connection being set up upon request, under the control of the intelligent network.

2. The method according to claim 1, wherein the first user is located in a network having an exchange and/or switch, the method further comprising the steps of:

dialing a telephone number by the first user to set up a speech connection from the first user to the second user;

directing a signal, based on the dialed telephone number through the exchange and/or switch to a Service Switching Point of the intelligent network, the Service Switching Point starting an inquiry via a signaling network to the service data base in response to the signal;

searching in the service database for the second user address data;

retrieving from the service database second user address data which includes the coded address and the gateway address;

returning the second user address data through the signaling network and the Service Switching Point back to the exchange and/or switch;

using said second user address data in the exchange and/or switch for setting up the speech connection, wherein the coded address is transmitted to the gateway;

decoding the coded address in the gateway, into the data network address; and connecting the speech connection call to the second terminal having said data network address.

3. The method of claim 2, wherein the network having an exchange and/or switch is a common channel signaling network.

4. A method of setting up a speech connection between a first user and a second user in a communication system including an intelligent network and a data network interconnected by a gateway, the second user being located in the data network, the method comprising the steps of:

transmitting a message including a data network address of a terminal with which the second user is associated, from the terminal via the gateway to the intelligent network, in order to notify the intelligent network of a location of the second user;

setting up a speech connection between the second user at the terminal and the first user, the speech connection being set up upon request, under the control of the intelligent network, wherein several telephone numbers and/or network addresses on which the second user may be reached are stored in a service database of the intelligent network;

dialing by the first user a personal number of the second user, a personal number being associated with the identity of the second user and comprising telephone numbers and/or network addresses at which the second user may be reached;

retrieving from the service database telephone numbers and/or network addresses corresponding to the personal number from the second user address data;

calling the telephone numbers and/or network addresses in a desired order; and establishing a speech connection to where the second user answers.

5. The method according to claim 4, further comprising:

giving the data network address a highest priority and calling the data network address first.

6. The method of claim 4, wherein the telephone number and/or network addresses comprise one or more of a mobile phone number, a paging device number, a voice mail number and a data network address.

7. A method of setting up a speech connection between a first user and a second user in a communication system including an intelligent network and a data network interconnected by a gateway, the second user being located in the data network, the method comprising the steps of:

transmitting a message including a data network address of a terminal with which the second user is associated, from the terminal via the gateway to the intelligent network, in order to notify the intelligent network of a location of the second user;

setting up a speech connection between the second user at the terminal and the first user, the speech connection being set up upon request, under the control of the intelligent network, and;

using at least one second message in the set up of the speech connection, each of the at least one second messages employing a protocol which defines a field reserved for call routing information retrieved from an intelligent network service database, the call routing information including the gateway address and the data network address.

8. A system for setting up a speech connection between a first user and a second user, the system comprising:

an intelligent network;

a data network in which the second user is located;

a gateway interconnecting the intelligent network and the data network;

means for transmitting a first message including a data network address of a terminal associated with the second user, the first message being transmitted from the terminal via the gateway to the intelligent network in order to notify the intelligent network of a location of the second user;

means for converting the data network address of the terminal into a coded address, the means for converting being within the gateway;

means for transmitting the coded address, a gateway address and a personal identifier of the second user to the intelligent network;

means for storing the coded address, the gateway address, and the personal identifier of the second user in a service database; and means for setting up a speech connection between the second user at the terminal and the first user, the speech connection being set up upon request, under the control of the intelligent network.

9. The system of claim 8 wherein the telephone numbers and/or network addresses comprise one or more of a mobile telephone number, a paging device number, a voice mail number and a data network address.

10. A system for setting up a speech connection between a first user and a second user, the system comprising:

an intelligent network;

a data network in which the second user is located;

a gateway interconnecting the intelligent network and the data network;

means for transmitting a first message including a data network address of a terminal associated with the second user, the first message being transmitted from the terminal via the gateway to the intelligent network in order to notify the intelligent network of a location of the second user means for setting up a speech connection between the second user at the terminal and the first user, the speech connection being set up upon request, under the control of the intelligent network;

means for retrieving telephone numbers and/or network addresses corresponding to a personal number of the second user stored in a service database, the personal number of the second user being associated with the identity of the second user and thereby including telephone numbers and/or network addresses on which the second user may be reached;

means for calling the telephone numbers and/or network addresses in a desired order; and means for establishing a speech connection to the second user.

11. A method of setting up a speech connection between a first user and a second user in a communication system including an intelligent network and a data network interconnected by a gateway, the second user being located in the data network, the method comprising the steps of:

transmitting a message including a data network address of a terminal with which the second user is associated, from the terminal via the gateway to the intelligent network, in order to notify the intelligent network of a location of the second user;

setting up a speech connection between the second user at the terminal and the first user, the speech connection being set up upon request, under the control of the intelligent network;

dialing an intelligent network service number by the second user;

dialing by the second user a personal identifier of said second user;

dialing by the second user a number of the first user;

routing the speech connection to the first user under the control of the intelligent network;

retrieving by a Service Control Point of the intelligent network a telephone number corresponding to the dialed number of the first user, the telephone number being retrieved from an intelligent network service database in response to the dialed number of the first user; and establishing a speech connection to the first user, the speech connection being to said telephone number as corresponding to a personal number of the first user.

12. The method according to claim 11, wherein the speech connection to the first user is routed via the gateway.

13. A method of setting up a speech connection between a first user and a second user in a communication system including an intelligent network and a data network interconnected by a gateway, the second user being located in the data network, the method comprising the steps of:

transmitting a message including a data network address of a terminal with which the second user is associated, from the terminal via the gateway to the intelligent network, in order to notify the intelligent network of a location of the second user;

setting up a speech connection between the second user at the terminal and the first user, the speech connection being set up upon request, under the control of the intelligent network, wherein several telephone numbers and/or network addresses on which the second user may be reached are stored in a service database of the intelligent network;

dialing by the first user a personal number of the second user, a personal number being associated with the identity of the second user and comprising telephone numbers and/or network addresses on which the second user may be reached;

retrieving from the service database telephone numbers and/or network addresses corresponding to the personal number from the second user address data;

calling the telephone numbers and/or network addresses in a desired order; and establishing a speech connection to where the second user answers, wherein the data network address is given a highest priority and the data network address is called first.

\* \* \* \* \*